Dec. 13, 1955 H. L. CHISHOLM, JR 2,726,737
TELESCOPIC SHOCK ABSORBER FOOT VALVE STRUCTURES
Original Filed Jan. 8, 1947 2 Sheets-Sheet 1
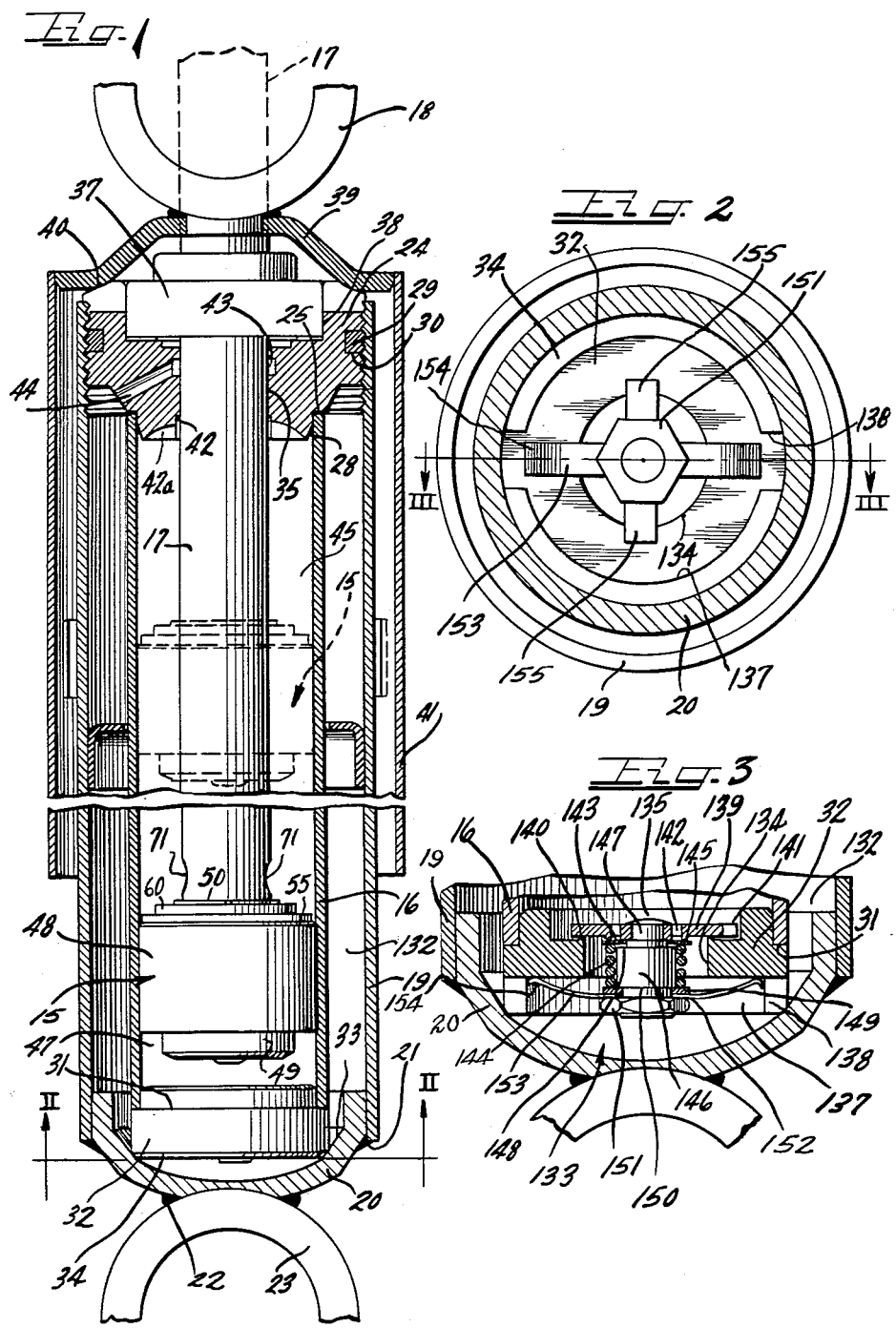
INVENTOR.
HARRY L. CHISHOLM, JR.
BY
ATTYS.

Dec. 13, 1955   H. L. CHISHOLM, JR   2,726,737
TELESCOPIC SHOCK ABSORBER FOOT VALVE STRUCTURES
Original Filed Jan. 8, 1947                    2 Sheets-Sheet 2
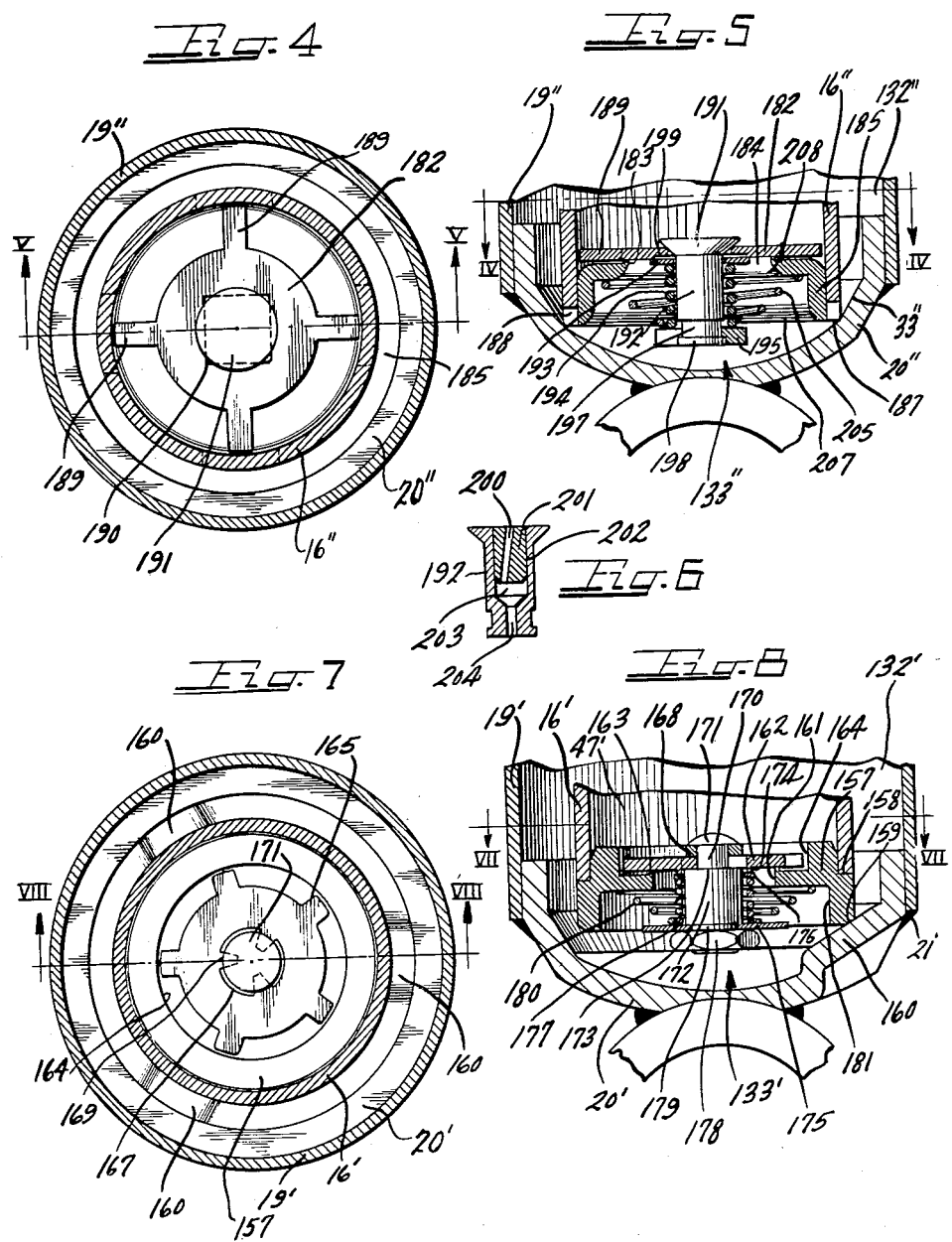
INVENTOR.
HARRY L. CHISHOLM, JR.
BY
ATTYS.

United States Patent Office 2,726,737
Patented Dec. 13, 1955

2,726,737

TELESCOPIC SHOCK ABSORBER FOOT VALVE STRUCTURES

Harry L. Chisholm, Jr., Buffalo, N. Y., assignor to Houdaille-Hershey Corporation, Detroit, Mich., a corporation of Michigan Original application January 8, 1947, Serial No. 720,853, now Patent No. 2,668,604, dated February 9, 1954. Divided and this application December 27, 1950, Serial No. 202,976

10 Claims. (Cl. 188—100)

The present invention relates to improvements in direct acting or telescopic shock absorbers, and more particularly concerns improvements in the foot valve structures for such shock absorbers.

The present application is a division of my application Serial No. 720,853, filed January 8, 1947.

An important object of the present invention is to provide improved control valve means, commonly referred to as foot valves, which are used in the lower portion of direct acting or telescopic shock absorbers to control the displacement of hydraulic fluid between the cylinder and reservoir of such shock absorber.

A further object of the invention is to improve the structures including the valve mechanism for controlling the displacement and replenishment flow of hydraulic fluid between the cylinder and reservoir chambers of a direct acting hydraulic shock absorber.

A further object of the invention is to provide foot valve structures for direct acting shock absorbers which are well adapted for low cost mass production methods of manufacture and which will measure up to high performance standards.

Other objects, features and advantages of the present invention will be readily apparent from the following detailed description of certain preferred embodiments thereof taken in conjunction with the accompanying drawings, in which:

Figure 1 is a fragmental, diametral, sectional view through a direct acting hydraulic shock absorber embodying the features of the present invention;

Figure 2 is a transverse, sectional plan view looking upwardly through the lower end portion of the hydraulic shock absorber, taken substantially on the line II—II of Figure 1;

Figure 3 is a diametral, fragmentary, vertical sectional view taken substantially along the line III—III of Figure 2;

Figure 4 is a transverse or top plan sectional view through a modified form of the shock absorber foot structure showing a modified form of foot valve construction and may be considered as taken on the line IV—IV of Figure 5;

Figure 5 is a diametral, sectional view taken substantially along the line V—V of Figure 4;

Figure 6 is a longitudinal, axial, sectional view taken through the valve plug member of Figure 5;

Figure 7 is a top plan, sectional view through the lower end portions of a direct acting hydraulic shock absorber showing a further modified form of foot valve structure as though taken on the line VII—VII of Figure 8;

Figure 8 is a diametral, sectional view taken on the line VIII—VIII of Figure 7.

A direct acting or telescopic shock absorber of the type with which the present invention is concerned operates on the principle of hydraulic fluid resistance to the reciprocations within a cylinder of a piston which is connected to one of the relatively movable parts, such as the sprung mass of a vehicle, while the cylinder is connected to the other of the relatively movable parts, such as the unsprung mass of the vehicle. In such a shock absorber the compression stroke of the piston, while resisted to a certain extent, is freer than the rebound stroke which is controlled to be substantially resisted to occur at a slower rate.

A shock absorber conforming to these requirements and embodying an improved, simplified assembly including novel and highly efficient control valve means is shown in Figure 1. This shock absorber comprises a piston 15 reciprocable within a cylinder 16 and having a piston rod 17 which extends beyond the end of the cylinder 16 and carries at its outer end suitable means such as an eye 18 by which it is adapted to be connected to one of relatively movable members such as an automobile chassis.

Concentric about the cylinder tube 16 is a tubular reservoir casing 19 of somewhat greater length and having the lower end thereof telescoped about the rim of a cup-shaped bottom head or closure 20, both the tubular casing 19 and the head 20 being formed from metal and secured together in fluid-tight relation as by means of welding 21. Secured to the outer side of the end closure 20 as by means of welding 22 is an eye 23 by which the lower end of the shock absorber is adapted to be connected to the remaining relatively movable member such as the axle structure of a vehicle in which the shock absorber is installed.

To secure the cylinder tube 16 rigidly within the shock absorber assembly, the top closure plug 24 is threaded into the upper end of the reservoir casing 19 and is formed with a downwardly facing annular shoulder 25 opposing the upper end of the cylinder 16. A downwardly protruding axial boss on the plug 24 has its upper portion cylindrical and its lower portion formed with an assembly-easing tapering circumference 28 and depends into the upper end portion of the cylinder 16 with a diametral press fit to insure hydraulic seal and concentricity. A thread seal 29 carried in an annular, radially outwardly opening intermediate groove 30 in the closure plug 24 provides a fluid-tight joint between the plug and the reservoir casing 19.

At its lower end the cylinder 16 bears against an annular, upwardly facing stepped shoulder 31 on a lower closure member or foot valve casing 32 which is clamped thereby against the inside of the lower closure cup 20. A properly self-centered relationship of the closure member 32 with respect to the closure cup 20 is assured by an inwardly sloping annular, herein substantially frusto-conical, formation 33 of the inner wall of the closure cup 20 against which the lower edge of the closure member 32 shoulders, such lower edge being preferably formed with a complementary seating bevel 34. Thus, assembly of the shock absorber structure is substantaily facilitated while at the same time manufacturing tolerances may be relatively large, the entire assembly being held together by the top closure plug 24. The cylinder 16, in the course of assembly, is substantially self-centering and with especial regard to the piston 15, the latter during the assembly operation being preferably disposed closely adjacent to the bottom of the cylinder 16 to assist in the attainment of concentricity.

Passage for the piston rod 17 is afforded through the closure plug 24 by an axial bore 35 therethrough. Leakage of hydraulic fluid out through the bore 35 or transportation of fluid beyond the bore by outward movement of the piston rod 17 is prevented by a packing gland unit 37 which is fitted within a concentric counterbore 38 in the outer end of the plug 24.

A head 39 carried by the outer extremity of the piston rod 17 has an annular shoulder 40 by which it is adapted to engage the outer end of the closure plug 24 as a limit stop upon extreme inward movement of the piston rod 17 and the piston 15. A shield tube 41 may be secured as by means of welding or the like to the outer edge of the shoulder 40 and surrounds the reservoir casing 19 in spaced concentric relation.

Outward transportation of hydraulic fluid by the piston rod 15 is further prevented by scraping off thereof in a groove 42 formed as a counterbore at the inner end of the piston bore 35 and into which open radial pressure relief slots 42a. An axially outwardly spaced fluid trap and drainage channel 43 angularly formed in the bore 35 and draining by means of a lateral passage 44 into the top of the reservoir space provided between the reservoir tube 19 and the cylinder 16 take care of such fluid as does travel out on the piston rod 17.

The piston 15 divides the space within the cylinder 16 into an upper high pressure chamber 45 and a lower low pressure chamber 47. In service a relatively low order of resistance is afforded to downward or compression movement of the piston 15 by hydraulic fluid which fills the chambers 45 and 47, while on the return or rebound stroke of the piston a relatively high order of resistance is provided for. To this end, the piston 15 is equipped with a valve system which will appropriately respond to hydraulic fluid pressures in the reciprocations of the piston to control the shock absorbing or damping function of the piston.

Since in the reciprocations of the piston within the cylinder of the shock absorber unit provision must be made for the volumetric displacement of the piston rod, the space between the cylinder 16 and the surrounding reservoir casing 19 is utilized as a piston rod displacement reservoir or replenishment chamber 132 which has no direct communication with the high pressure chamber 45 but does have communication with the low pressure chamber 47 through a foot valve structure 133 (Figures 2 and 3) associated with the casing 32. To this end, the casing 32 is formed with an axial displacement bore or port 134 of substantial diameter opening at its upper end into an enlarged diameter counterbore 135 and at its lower end into a yet larger diameter counterbore 137. From the counterbore 137 radial slots 138 afford communication passages for fluid between the space below the casing 32 and the reservoir 132. Due to the substantially dished construction of the closure cup 20, the free space below the foot valve assembly will be of substantial volume.

Flow of hydraulic fluid through the displacement port 134 is checked against compression pressure or force by the piston 15 by a check valve 139 which is preferably in the form of a disk seating on the shoulder provided by the counterbore 135 and which is preferably formed about the bore 134 with a raised narrow, annular valve seat 140 affording a thin line, non-sticking contact with the valve disk 139. The disk valve 139 is formed with uniformly spaced radially extending spacer fingers 141, the ends of which closely approach the cylindrical wall of the counterbore 135 for maintaining the valve substantially concentric with respect to the valve seat 140.

The valve disk 139 checks the flow of hydraulic fluid through the bore 134 responsive to displacement pressure on the compression stroke of the piston, but it is during such stroke that actual displacement of hydraulic fluid from within the cylinder is necessary in order to compensate for the displacement of the piston rod. To this end, means for controlled compression fluid displacement are provided by an annular, concentric series of small displacement orifices or ports 142 through the valve disk 139 and of predetermined aggregate flow area. For cushioning or shock absorbing purposes, displacement of hydraulic fluid through the ports 142 is controlled by a valve 143 which is normally biased with predetermined force or tension by a compression spring 144 into sealing relation with the lower face of the valve 139 about the area of the ports 142.

High efficiency with a minimum of operational noise is attained by having the valve 143 in the form of a disk ring, relatively thin and preferably formed on a slight frusto-conical bevel to seat against a complementary downwardly projecting seat 145 formed about and including the ported area in the valve disk 139 and sloping away from the ports 142. Thereby the displacement hydraulic fluid issuing through the ports 142 is directed laterally and downwardly into the space provided by the displacement port 134.

The compression spring 144 is preferably in the form of a helically coiled member concentrically encompassing a downwardly extending stem member 146 which is secured through the medium of a headed reduced diameter stem 147 on the axis of the valve disk 139 to depend therefrom. At the upper portion of the stem 147 the stem is formed with a clearance rabbet groove 148 to accommodate the check valve 143 throughout a limited axial range of opening movement.

An abutment for the lower end of the valve biasing spring 144 is provided by a collar 149 in the form of a ring disk bearing against a downwardly facing shoulder 150 adjacent to the lower end of the valve stem 146 and secured in place by means such as a nut 151 threaded onto the lower end of the valve stem.

Hydraulic fluid displaced from the low pressure chamber 47 in the compression stroke of the piston 15 will bleed through the ports 142 in the valve disk 139 upon attaining a pressure which will overcome the predetermined tension of the valve biasing spring 144 to force the check valve 143 open. Due to the predetermined resistance to compression fluid displacement afforded by the check valve 143, there is assurance that in the compression stroke of the piston 15 sufficient hydraulic fluid will be displaced from the low pressure chamber 47 to the high pressure chamber 45 in the cylinder to maintain the latter filled before pressure fluid is displaced into the reservoir 132. At the same time, of course, the shock absorbing function of the unit is implemented by the hydraulic fluid flow resistance afforded by the check valve 143 in conjunction with the compression blowoff valve resistance afforded in the piston assembly.

On the other hand, the preferred operating condition within the shock absorber unit requires that replenishment of the hydraulic fluid supply in the low pressure chamber 47 during the rebound stroke of the piston 15 be accomplished with a minimum of hydraulic fluid resistance so that the action of the rebound blowoff valve in the piston assembly will not be unbalanced or unduly influenced and the full benefits of the high pressure created in the high pressure chamber 45 will be utilized in the rebound stroke of the piston. To this end, the check valve 139 is positively held to its seat with sufficient restraint to avoid being unseated by back pressure working thereunder in the compression stroke of the piston but of a low enough order to permit the valve to be unseated comparatively freely during the rebound stroke of the piston for rebound replenishment of the low pressure chamber 47 in the cylinder. In the present instance this is accomplished by equipping the valve stem 146 with a relatively weak-fingered restraining spring 152 which may comprise a thin axially apertured disk clamped between the collar 149 and the nut 151. The spring 152 has a pair of diametrically extending relatively long and highly flexible, outwardly bowed spring arms or fingers 153 terminally formed with smoothly rounded engagement pads 154 bearing slidably against the under face of the casing 32 within the counterbore 137. The arrangement of the spring fingers 153 is such that the valve disk 139 may unseat to a liberal extent for replenishment flow of hydraulic fluid thereby.

For limiting the total extent of unseating movement of the valve 139, radially extending preferably horizontal limit arms or fingers 155 at right angles to the spring fingers 153 may be provided on the collar 149 for engaging the underside of the casing 32 in supplement to the fully sprung fingers 153 when the valve disk 139 has reached its predetermined unseated limit. Such limit is preferably held to within the depth of the radially confining counterbore 135 so that the centering fingers 141 of the valve disk will not leave the upper limit of the counterbore.

The modified foot valve construction shown in Figures 7 and 8 is operationally much the same as that already described in connection with Figures 2 and 3 but embodies structural variations which have been found advantageous under certain circumstances. In this modified form of the invention, a foot valve assembly 133' is carried by a casing 157 which provides a lower end closure for and supports the lower end of the cylinder 16' by which it is clamped within a substantially cup-shaped lower end cup or closure 20' secured by means of welding 21' within the lower end portion of outer reservoir casing 19'. The cylinder has low pressure chamber 47' above the valve casing 157, and the cylinder 16' and the reservoir casing 19' define in the cylindrical space therebetween a replenishment reservoir 132'.

The valve casing 157 is preferably of substantially the same outside diameter as the cylinder 16' and has an upper outer edge rabbet groove 158 within which the lower edge of the cylinder is seated. The lower edge of the casing 157 is preferably beveled as indicated at 159 and bears against a uniformly spaced series of inwardly or upwardly projecting inwardly slanting, elongated spacer bosses or ribs 160 which may, as shown in Figure 7, be three in number, pressed integrally from the cup of the lower end closure member 20' to maintain the valve casing 157 spaced from the closure member and thereby assuring free communication between the reservoir 132' and the substantial space below the valve casing 157.

For fluid passage therethrough the valve casing 157 is provided with a relatively large diameter axial bore or port 161 which is controlled against free compression displacement of hydraulic fluid from the chamber 47' by a check valve 162. The latter is preferably in the form of a disk seated upon a narrow substantially line-contact upwardly extending spacer lip or flange 163 formed on the casing 157 about the port 161 in the bottom of a counterbore 164. The wall of the counterbore 164 affords radial confinement for the valve 162 to maintain the same substantially concentric within the casing 157. A plurality of radially extending spacer fingers 165 on the valve disk 162 oppose the cylindrical wall of the counterbore 164.

Hydraulic fluid displacement through the valve disk 162 during the compression stroke of the piston in the shock absorber is provided for by an axial port 167 which is of slightly larger diameter than a flow restricting washer 168 supported upon radially inwardly extending equidistantly spaced spider fingers 169, the ends of which define a bearing circle for a reduced diameter neck 170 of a valve stem 172. The neck 170 extends through and holds the washer 168 centered. A rivet head 171 at the upper extremity of the neck bears against the washer and a shoulder 173 about the base of the neck bears against the underside of the fingers 169 and cooperates with the head to clamp the washer and fingers together and secure the valve stem 172 in the assembly. The diameter of the valve stem 172 is preferably substantially the same as the diameter of the restricting washer 168 so that the marginal segments of the port 167 exposed beyond the periphery of the washer 168 and the valve stem 172 between the fingers 169 provides passageway for displacement hydraulic fluid during the compression stroke of the piston.

Predetermined restraint upon compression displacement of hydraulic fluid through the port 167 is accomplished by means of a valve 176 in the form of a thin disk annulus slidably encircling the valve stem 172 and normally held to a downwardly extending limited contact seat flange 174 about the port 167 by a biasing spring 175 encircling the stem 172. The spring 175 is preferably in the form of a helical coiled unit maintained under predetermined compression load by a shoulder flange disk 177 secured in place about the lower end of the valve stem 172 by means of a nut 178 threaded onto a reduced diameter lower extremity portion of the valve stem.

The shoulder washer 177 serves also as the abutment for the lower reduced diameter end of a relatively weak upwardly extending, expanding spiral spring 180 shouldering against the lower face of the valve casing 157 within a relatively large diameter downwardly opening counterbore 181 therein. The diameter of the shoulder disk or flange 177 is preferably somewhat greater than the diameter of the port 161 so as to limit upward unseating displacement of the check valve 162 when the relatively light spring bias afforded by the spring 180 is overcome in replenishment displacement of hydraulic fluid from the reservoir 132' into the low pressure chamber 47' in response to the suction created therein during rebound of the piston.

In the modification shown in Figures 4 to 6, inclusive, a relatively simplified foot valve structure 133" has been provided. This form has proved to be unusually quiet in operation under conditions which might otherwise produce operational noises, as under relatively high magnitude compression hydraulic fluid pressure. In addition the foot valve assembly 133" is especially suitable for conditions requiring a relatively high compression value.

Accordingly, the foot valve assembly 133" includes a disk type of compression check valve 182 which is of a diameter to seat sealingly upon an upper raised thin line valve seat flange 183 defining a relatively large axial hydraulic displacement flow port 184 in a valve casing 185. The valve casing 185 is preferably formed as a substantially inverted cup-shaped body of an external diameter to be assembled slidably within the lower end portion of a cylinder 16" and has a laterally extending lower marginal flange 187 underlying the lower edge of the cylinder and clamped thereby against the bottom of a cup-shaped bottom closure member 20" secured within the lower end portion of a reservoir casing 19".

The flange 187 is preferably of a diameter to engage at approximately the juncture of a frusto-conical inwardly tapered annular portion 33" of the bottom closure, a plurality of slots 188 in the flange 187 affording passageways for hydraulic fluid between reservoir space 132" and the space below casing 185. As shown in Figure 4, the valve disk 182 is preferably provided with a plurality of equidistantly spaced, radially extending spacer arms 189 which relatively closely approach the inner wall of the cylinder 16" for maintaining the valve disk 182 substantially concentric therein.

Compression displacement flow of hydraulic fluid through the valve disk 182 is controlled to establish fairly high compression value while at the same time avoiding or at least minimizing fluid noise during operation. To this end, the valve disk 182 is formed with an axial substantially square port 190 preferably having the corner thereof slightly rounded, as shown in Figure 4, and blocked throughout the major portion of its area by a substantially frusto-conically tapered, mushroom head 191 at the upper end of a valve stem 192 and of substantially greater major diameter than the diametral distance between the flat sides of the fluid port 190. This leaves only quite restricted hydraulic fluid passages at the rounded corners of the fluid port 190 through which hydraulic fluid forced by compression may pass, substantially free from agitating obstructions along the inwardly tapering head 191 toward the smooth depending cylindrical smaller diameter valve stem 192. Such compression fluid displacement is, however, normally restrained by a valve 193 which is preferably in the form of a disk annulus slidably encircling the valve stem 192.

The valve 193 is held seated under predetermined load by means such as a biasing spring 194 of the coiled compression type freely encircling the valve stem 192 and held under compression by a spring seat collar 195 carried by the lower end of the valve stem 192. By preference, the collar 195 comprises a split ring of flat horse-shoe shape so designed that it can be snapped in assembly onto a reduced diameter lower extremity 197 on the valve stem formed with an integral lateral retaining collar 198 at its extremity. To avoid sticking of the valve disk 193, the area immediately opposed thereby about the port 190 and to within a relatively narrow margin of the valve 193 is recess-relieved as indicated at 199.

Additional compression fluid displacement flow area is provided for through the body of the valve stem 192. To this end, an axially opening and preferably slightly slanting passage 200 (Figure 6) extends down through a plug 201 secured as by press fitting into a bore 202 extending axially down through the head 191 and into the valve stem 192. The plug 201 is shorter than the length of the bore 202 which inwardly of the end of the plug provides a chamber 203 having the lower end thereof substantially restricted and opening through the lower end of the valve stem through a relatively small diameter orifice 204. In practice, a slanting angle of approximately 10° for the passage 200 has been found to afford efficient lateral offsetting of its inner end relative to the inner adjacent end of the orifice 204 to cause hydraulic fluid displaced by compression through the passage 200 to surge into the chamber 203 which thereby constitutes an intermediate muffler chamber which substantially reduces fluid noise in the passage of the fluid onwardly through the orifice 204. For best results, it has been found desirable to have the upper discharge orifice 200 of approximately 50% smaller cross-sectional flow area than the passage 204. In addition to diverting part of the compression-displaced hydraulic fluid and causing it to pass in part through the muffler chamber 203, the four relatively small passages afforded at the corners of the blocked port 190 on compression blowoff therethrough further diminish potential noise of the relatively high pressure displaced fluid by breaking the remainder of the displaced fluid up into four small relatively smoothly flowing non-conflicting streams.

Relatively free replenishment flow of hydraulic fluid from the fluid reservoir 132″ on rebound is effective through the port 184 from which the check valve 182 is adapted to lift in opposition to the relatively slight resistance of an upwardly expanding spiral restraining spring 205 which at its lower, smaller end bears against the collar 195 on the valve stem and at its upper larger diameter end bears against the inner opposing face of the valve casing 185 radially outwardly adjacent the port 184. For quiet, smooth replenishment fluid flow through the casing 185 the inner corner of the lower edge thereof adjacent the flange 187 is preferably rounded off as indicated at 207, while the edge thereof defining the orifice is preferably rounded as shown at 208.

It will be understood that modifications and variations may be effected without departing from the scope of the novel concepts of the present invention.

I claim as my invention:

1. In a direct acting hydraulic shock absorber foot valve assembly including a casing having a replenishing fluid flow port therethrough of substantial flow area and defined by a vertical port of substantial length with an upwardly facing valve seat at its upper end and a downwardly facing shoulder of substantial lateral extent at its lower end, a disk valve engaging said valve seat for checking compression flow through said port and having restricted compression displacement flow passage therethrough, a flow controlling valve normally sealing said restricted passage, a stem projecting from said disk valve through said replenishing flow port and down past said shoulder, disk valve-controlling spring structure comprising radially extending spring arms carried by the lower end portion of the stem for engaging said shoulder of the valve casing and permitting a substantial range of reciprocation of the valve stem for opening and closing movement of the disk valve, and stop arms carried by said lower end portion of the stem between and angularly related to said spring arms and normally spaced below said shoulder but engageable therewith for limiting movement of the stem in the unseating direction of the disk valve.

2. In combination in a foot valve structure for controlling displacement of fluid between the cylinder and reservoir in the lower portion of a direct acting shock absorber, a valve cage body having means for engagement by a shock absorber cylinder lower end portion to retain the valve cage body in operative relation to a reservoir structure of the shock absorber, said cage body having a vertical bore of substantial diameter and of substantial length with an upwardly facing valve seat about the upper end of the bore and a downwardly facing annular shoulder of substantial diameter on the cage body about the lower end of the bore, a disk valve seating displaceably upon said valve seat and having a stem of substantially smaller diameter than said bore projecting down through the bore and a limited distance below said shoulder, a leaf spring arm member having diametrically oppositely extending spring arms, a stop arm member having diametrically oppositely directed stop arms and comprising a substantially rigid element, said spring arm and stop arm members being disposed in crossing relation and centrally attached to the lower end portion of said stem below said shoulder, said spring arms extending laterally and upwardly from the attachment to the stem and normally engaging said shoulder substantially spaced laterally from said bore for biasing the stem and thereby said disk valve downwardly relative to said valve seat, and said stop arms normally lying in limited spaced relation below said shoulder at diametrically opposite sides of said bore and engageable with the shoulder adjacent the lower end of the bore upon predetermined limit of upward movement of the stem and valve in opposition to the bias of said spring arms.

3. The combination defined in claim 2, wherein the valve cage body has an upper counterbore within which the valve seat is provided and with the valve disk having its perimeter closely related to the wall defining the upper counterbore to retain the valve disk and stem substantially centered with respect to the bore, the lower portion of the cage body having a downwardly opening counterbore of substantially larger diameter than said upwardly opening counterbore and within which said shoulder is provided, said spring arms extending laterally to substantially greater diameter than said valve disk.

4. In a foot valve construction for use in the lower portion of a direct acting shock absorber for controlling displacement of fluid between the lower end of a cylinder and the lower end portion of a reservoir in the shock absorber, a valve cage body having a vertical central port of substantial diameter therethrough and providing an upwardly facing valve seat about the upper end of the port and a downwardly facing shoulder at the lower end of the port, a valve disk seated on said valve seat and having a depending stem of smaller diameter projecting in fluid clearance relation downwardly through said port, the lower end portion of said stem having a downwardly directed shoulder, a reduced diameter lower end portion of the stem extending below said lower stem shoulder, a member having a central aperture through which said reduced diameter lower end portion of the stem projects, means carried by said lower reduced diameter end portion of the stem securing said member against said stem shoulder, said member having diametrically oppositely extending portions normally underlying said valve cage body shoulder in spaced relation and serving as a limiting stop engageable with the shoulder upon limited upward movement of the valve and valve stem, and spring means bearing against said member and against said shoulder of the valve cage body and normally biasing the valve stem downwardly to maintain engagement of the valve with said seat.

5. The combination as defined in claim 4 wherein the valve disk has a bypass opening therein laterally beyond the upper portion of the valve stem, and an auxiliary disk valve engageable with the disk valve for checking upward flow of fluid through said bypass opening, and a coiled compression spring disposed about the valve stem and seating at its lower end upon said member and at its upper end thrusting said auxiliary valve into engagement with the valve disk.

6. In combination in a foot valve structure for telescopic shock absorbers, a valve cage member having a vertical port therethrough defined at its upper end by a valve seat, a disk valve engaging said seat and blocking downward flow of fluid through said port, said disk valve having a depending stem of smaller diameter than said port projecting downwardly therethrough, said stem having an upwardly facing shoulder thereon spaced a limited distance below said disk valve, said disk valve having a bypass passage adjacent the upper end portion of the stem, a disk valve ring about the upper end portion of the stem and movable between said shoulder and said disk valve, and spring means carried by the stem and normally thrusting against said valve ring to drive it from said shoulder into fluid-checking engagement with the disk valve at the lower side of said passage, said shoulder limiting unseating movement of the ring valve responsive to fluid pressure through the bypass passage in opposition to said spring means.

7. In combination in a foot valve structure for controlling displacement of fluid between the cylinder and reservoir in the lower portion of a direct acting shock absorber, a valve cage body having means for engagement by a shock absorber cylinder lower end portion to retain the valve cake body in operative relation to a reservoir structure of the shock absorber, said cage body having a vertical bore of substantial diameter and of substantial length with an upwardly opening counterbore concentric with the upper end of said bore and defined by a circumscribing upwardly directed annular flange, said counterbore providing an upwardly facing valve seat about the upper end of the bore, a downwardly facing annular shoulder on the cage body about the lower end of the bore, a valve member of substantial diameter seating displaceably upon said valve seat and having a stem of substantially smaller diameter than said bore projecting down through the bore and a limited distance below said shoulder, said valve member being retained by proximity of its marginal portion to said upstanding flange against any substantial radial displacement so that said stem is maintained substantially centered in said bore, and a stop member carried by the lower end portion of said stem, said stop member having a portion thereof normally lying a distance below said shoulder less than the height of said upstanding flange and limited in upward movement by said shoulder to thereby limit upward movement of the stem and valve member for avoiding overrunning of the valve member above said upstanding flange during unseating movement of the valve member.

8. In combination in a foot valve structure for controlling displacement of fluid between the cylinder and reservoir in the lower portion of a direct acting shock absorber, a valve cage body having means for engagement by a shock absorber cylinder lower end portion to retain the valve cage body in operative relation to a reservoir structure of the shock absorber, said cage body having a vertical bore of substantial diameter and of substantial length with an upwardly facing area providing a valve seat adjacent the upper end of said bore, an upstanding flange at the outer border of said area, a downwardly facing area providing a downwardly directed shoulder on the cage body adjacent the lower end of the bore, a valve member of substantial diameter seating displaceably upon said valve seat and having a stem of substantially smaller diameter than said bore projecting down through the bore and a limited distance below said shoulder, said valve member being retained by proximity of its marginal portion to said upstanding flange against any substantial radial displacement so that said stem is maintained substantially centered in said bore, a stop member carried by the lower end portion of said stem, said stop member having a portion thereof normally lying a distance below said shoulder less than the height of said upstanding flange and limited in upward movement by said shoulder to thereby limit upward movement of the stem and valve member for avoiding overrunning of the valve member above said upstanding flange during unseating movement of the valve member, and a spring engaging said shoulder and said stop member and normally biasing the valve-stem-stop member assembly to maintain the valve member seated on said seat.

9. A foot valve structure as defined in claim 8 wherein the spring comprises a double arm leaf spring secured in contact with said stop member and with the arms of the spring normally extending upwardly beyond the stop member for engaging the shoulder continuously.

10. A foot valve structure as defined in claim 8 wherein the spring comprises a coiled compression spring of generally helical arrangement having its smaller diameter end portion seated in engagement with the stop member and its larger diameter end portion engaging said shoulder and thrusting against said stop member and said shoulder.

References Cited in the file of this patent

UNITED STATES PATENTS

| | | |
|---|---|---|
| 187,022 | Loughridge | Feb. 6, 1877 |
| 214,321 | Scott | Apr. 15, 1879 |
| 824,318 | Thorp | June 26, 1906 |
| 892,886 | Prest | July 7, 1908 |
| 1,263,570 | La Chapelle | Apr. 23, 1918 |
| 1,758,671 | Loughead | May 13, 1930 |
| 1,841,354 | Bowen | Jan. 19, 1932 |
| 1,983,064 | Bates | Dec. 4, 1934 |
| 2,138,513 | Rossman et al. | Nov. 29, 1938 |
| 2,148,839 | Rossman et al. | Feb. 28, 1939 |
| 2,343,901 | Groves | Mar. 14, 1944 |
| 2,345,547 | Roth et al. | Mar. 28, 1944 |
| 2,388,755 | McLeod | Nov. 13, 1945 |
| 2,489,216 | Folmsbee | Nov. 22, 1949 |